US006409353B1

(12) United States Patent
Guttenberger

(10) Patent No.: US 6,409,353 B1
(45) Date of Patent: Jun. 25, 2002

(54) ADJUSTABLE REARVIEW MIRROR ASSEMBLY

(75) Inventor: Richard Guttenberger, Greding (DE)

(73) Assignee: Bühler Motor GmbH, Nürnberg (DE)

( * ) Notice: Subject to any disclaimer, the term of this patent is extended or adjusted under 35 U.S.C. 154(b) by 0 days.

(21) Appl. No.: 09/899,574

(22) Filed: Jul. 6, 2001

(30) Foreign Application Priority Data

Jul. 7, 2000 (DE) .......................................... 100 33 088

(51) Int. Cl.[7] .............................................. G02B 7/182
(52) U.S. Cl. ...................... 359/879; 359/880; 359/871; 359/872; 359/838; 359/841
(58) Field of Search ................................ 359/879, 880, 359/881, 882, 871, 872, 877, 838, 841; 248/477, 478, 480, 496

(56) References Cited

U.S. PATENT DOCUMENTS

| | | | |
|---|---|---|---|
| 4,056,253 A | * | 11/1977 | Repay et al. ............... 248/479 |
| 4,324,454 A | * | 4/1982 | Kumai ....................... 350/289 |
| 5,363,246 A | | 11/1994 | Perry et al. |
| 5,610,772 A | | 3/1997 | Iizuka |
| 5,781,356 A | | 7/1998 | Okada et al. |
| 5,943,176 A | | 8/1999 | Mertens |
| 6,336,726 B1 | * | 1/2002 | Lang et al. ................. 359/871 |

FOREIGN PATENT DOCUMENTS

| | | | | |
|---|---|---|---|---|
| DE | G 91 07 365.0 | | 9/1991 | ............. B60R/1/00 |
| DE | 299 15 605 U1 | | 1/2000 | |
| FR | 2 714 638 A1 | | 7/1995 | |
| WO | WO99/64270 | | 12/1999 | ............. B60R/1/06 |

* cited by examiner

Primary Examiner—Mohammad Sikder
(74) Attorney, Agent, or Firm—Jacobson Holman, PLLC

(57) ABSTRACT

Adjustable rearview mirror for a vehicle, in particular a motor vehicle, an aircraft, or a water craft, having a drive housing that is connected to a mirror carrier in a rotationally secured manner, with the connection between the mirror carrier and the drive housing being a snap connection.

23 Claims, 4 Drawing Sheets

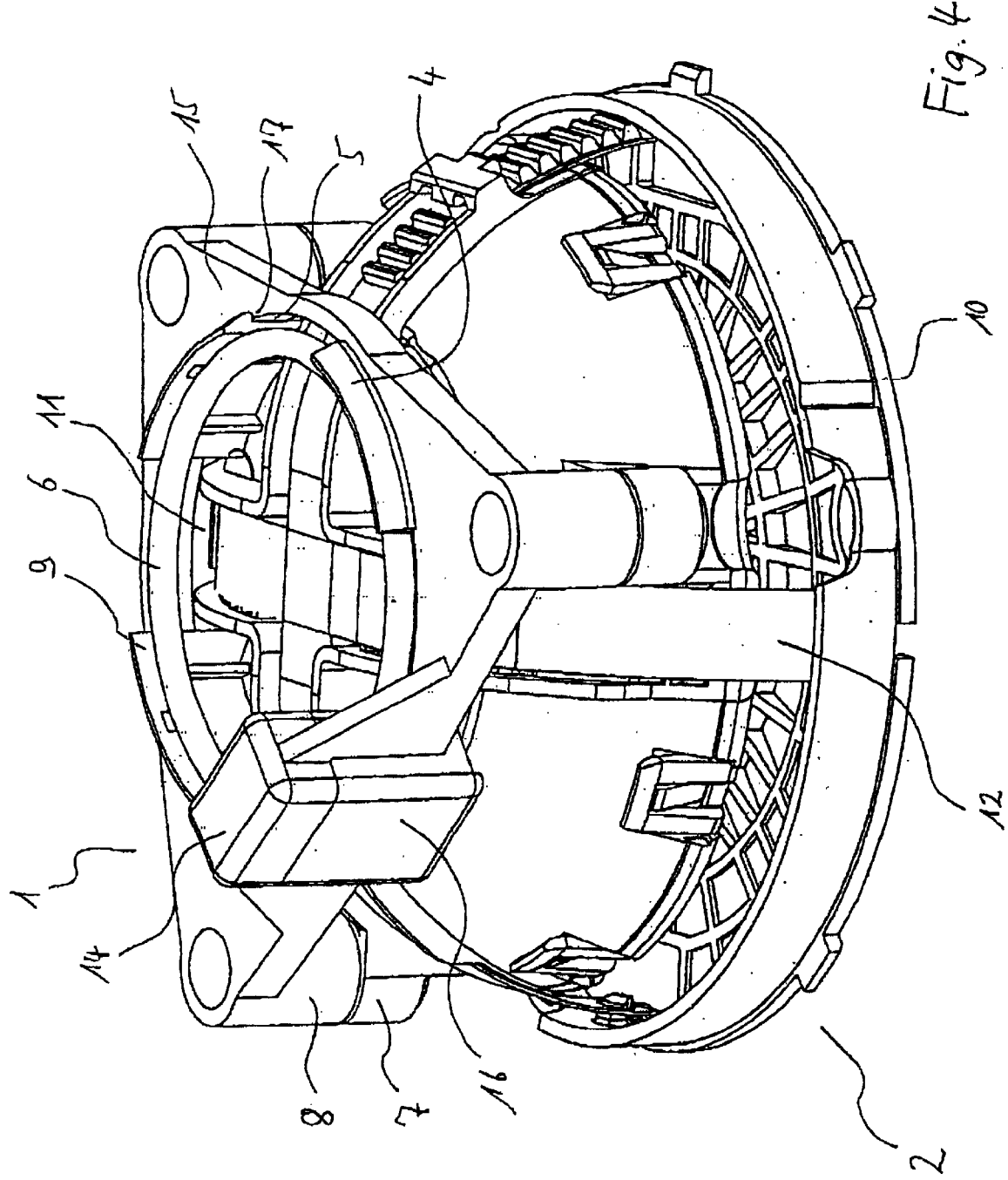

ADJUSTABLE REARVIEW MIRROR ASSEMBLY

BACKGROUND OF THE INVENTION

1. Field of the Invention

The present invention relates to an adjustable rearview mirror for a motor vehicle, an aircraft, or a watercraft, to name a few. The adjustable mirror is of the type that has a drive housing rotatably secured to a mirror carrier. Adjustable rearview mirrors of this type are widely used, especially in the automotive industry, where the mirror carrier is mounted to a device that is fixedly mounted to a motor vehicle and the drive housing includes at least one drive unit, generally an electromotor, and optionally has one or more gears.

2. Background

In the commonly known adjustable rearview mirrors, the drive housing is attached to the mirror carrier with the aid of self-tapping screws. Further, as a general rule, the connection in the drive housing to the wiring system necessary for the operation of the at least one drive unit occurs either by way of individual cables or by way of a plug connector, with complementary connections being provided on the mirror carrier and the drive housing so that the connections are eventually electrically and mechanically connected to one another.

However, the prior art option for attaching a drive housing to a mirror carrier by means of self-tapping screws and/or self-cutting screws and the subsequently necessary production of an electrical connection between the mirror carrier and the drive housing, has proven to be extremely labor-intensive and time-consuming. Moreover, handling of small parts such as self-tapping screws as well as all of the intermediate pieces for electrical contacts is a time-consuming operation. Also the logistics of handling all of the parts in the manufacturing process can become quite complex.

It is thus an object of the present invention to further develop the known adjustable rearview mirror in such a way that a simple and cost-effective mounting of the drive housing on the mirror carrier becomes possible, where, in particular, an electrical connection between the mirror carrier and the drive housing can be created at the same time that the drive housing is joined to the mirror carrier.

SUMMARY OF THE INVENTION

The object of the invention is attained in a particularly advantageous manner by means of an adjustable rearview mirror in which electrical contacts on the mirror carrier and the drive housing are constructed in such a way that, in the course of connecting the drive housing to the mirror carrier by a snapping-together sequence, an electrical connection is created at the same time between the mirror carrier and the drive housing.

In a first embodiment of the invention, conductor strips are integrated on or into the mirror carrier. The conductor strips have contact points for electrically contacting the electrical contacts of the drive housing. This arrangement represents a method of electrical contacting that is particularly simple, reliable, and reasonable from the point of view of production engineering. This is especially true if the mirror carrier also serves as a power source and optionally a mounting surface for other electrical components such as, for example, side blinkers, sensors, GPS antennas, etc. Moreover, integrated conductor strips are better protected from outside influences such as moisture and the like thus increasing the overall reliability of the system.

In a second alternative embodiment, the electrical contacts are each incorporated into a plug connection and a corresponding socket, with the socket being arranged on the drive housing or on the mirror carrier and the plug connection being correspondingly arranged on the other of the mirror carrier and drive housing.

In both alternative embodiments, electrical components can also be controlled and operated on the drive housing or mirror carrier by means of bus technology, which considerably reduces the expense with regard to the number of conductor cables as well as the costs of electrical contacts.

In an embodiment that is easy to produce and to handle, the snapping elements on the drive housing and a socket are provided in such a way that, when the snapping elements are locked into an opposing contour that forms part of the mirror carrier, a plug attached to correspond to the opposing contour engages into the socket such that, along with the sequence of the mechanical connection by means of snapping in and/or out, an electrical connection is created at the same time between the mirror carrier and the drive housing connected thereto.

Naturally, it is also possible to attach the snapping elements and/or the socket to the mirror carrier such that the opposing contour is arranged on the drive housing and/or is assigned to the drive housing. The electrical contacts, in particular the plug connection and the socket, can also be constructed in such a way that the insertion direction of the plug and/or the contacting is displaced, in particular by 90°; in this case, the contacting must occur in a process step that is separate from the snapping-in process.

In accordance with another aspect of the invention, the fastening of the drive housing to the mirror carrier also occurs by means of an adhesive connection that is provided alone or in combination with the snap fastening.

In accordance with a further aspect of the invention, the snap connection of the drive housing to the mirror carrier is constructed in a detachable manner such that repair of the drive housing and/or the mirror carrier is possible in a simple manner without one of the two parts being an obstacle or completely excluding the possibility of a repair.

The detachability of a snap fastening is guaranteed in that the mirror carrier is either accessible from the rear such that the locking parts of the snapping elements and/or segments can be pressed out of their fixed positions or the locks of the snapping segments are detached with the aid of a special tool that is introduced from the front in the case where the rear portion of the mirror carrier is inaccessible.

In accordance with yet another aspect of the invention, the mechanical connection between the mirror carrier and the drive housing is twist-proof and/or displacement-proof. This is especially advantageous upon startup of the at least one drive unit arranged in the drive housing because a torsion momentum acts on the mirror carrier and/or the drive housing such that the twisting of the mirror carrier and the drive housing in opposite directions and the displacement of the two parts opposite one another would likely occur if the connection between the mirror carrier and the drive housing is not constructed in a twist-proof and/or displacement-proof manner. In this way, twisting and/or displacement of the drive housing and the mirror carrier relative to one another is permanently prevented by the combined snap fastening of the drive housing to the mirror carrier and the plug connection which takes advantage of an electrical connection that uses plugs and sockets.

According to another aspect of the invention, means for producing an electrical connection between the mirror carrier and the drive housing, especially a plug-socket arrangement, are constructed on and/or integrated with the first and/or the second contour of the mirror carrier. For example, a plug is formed on the mirror carrier or on the drive housing and the corresponding socket on the other of the mirror carrier or drive housing.

In another variant of the invention, it is possible to attach the electrical contacts in the respective fastening contours and/or surfaces such that a separate plug along with a socket is not necessary. Moreover, implementation of the control and electrical connection necessary for operating the drive unit is possible in that the snapping, snapping and plug, or snapping and adhesive connections between the drive housing and mirror carrier have electrically conductive contact surfaces mounted thereon.

In a preferred embodiment of the invention, the number of contour elements necessary for fastening the drive housing to the mirror carrier is at least large enough such that a contour element is available for each electrical contact and electrical connection that is necessary. Naturally, the device according to the invention can also have several contours that are not needed for the electrical connection of the mirror carrier and drive housing or additional separate electrical plug connections can be provided that engage one another in the case of a connection of the drive housing and mirror carrier according to the invention.

In accordance with a further and particularly advantageous aspect of the invention, the mirror carrier is constructed as being one piece with an element for mounting the mirror carrier on the vehicle. In this embodiment, it has been shown to be particularly advantageous that the drive housing can be attached to a device for mounting the drive housing on the vehicle directly and without another intermediate piece. Thus, the mirror carrier has a mirror head that is attached to a mirror foot which, in turn, is attached to the vehicle such that the number of necessary parts is reduced from initially several self-tapping screws and at least one intermediate piece for the purpose of electrical contact as well as the mirror carrier and the drive housing to two components, firstly, the mirror carrier, which is constructed as being one piece with a device for mounting it on a vehicle, and, secondly, the drive housing. This construction not only provides for quicker mounting, but also achieves a reduction in costs.

Alternately, it is possible to attach the mirror carrier separately to a device for mounting the mirror carrier on a vehicle. In this way, the mirror carrier and the drive housing can be universally attached to various devices for mounting on a vehicle without it being necessary to take into account adaptation between the mounting device and the drive housing and mirror carrier assembly.

In accordance with another aspect of the invention, the rearview mirror has a spring device for securing the snap fastening of the drive housing to the mirror carrier. This arrangement has been shown to be especially advantageous in rearview mirrors that are subjected to strong vibrations and/or jerky movements. Such a spring device can be constructed, for example, as a spring washer made of metal or plastic, as a bracket made of the materials corresponding the drive housing and mirror carrier, or as a stiff rubber cuff that surrounds the drive housing and mirror carrier and presses them against one another in an appropriate manner.

In accordance with a particularly preferred embodiment of the invention, it is thus possible for the drive housing to be premounted before the connection to the mirror carrier. A mirror glass carrier, a force transfer device between the drive housing and the mirror glass carrier and the mirror glass are mounted in a complete manner and, in this state, may be connected to the mirror carrier by a simple approach of the completely premounted drive housing. Thus, a connection of the premounted drive housing to the mirror carrier is possible in a favorable manner in a single process step.

Alternately, recesses that are provided on the drive housing and serve as anti-twisting means according to the invention can serve as screw recesses for an alternative fastening of the drive housing to the mirror carrier by screwing.

Further advantages and useful aspects of the invention result from an exemplary embodiment that will be described in further detail with reference to the drawings. Parts that are the same or have the same effect are assigned the same reference characters.

BRIEF DESCRIPTION OF THE DRAWINGS

FIG. 4 is a perspective view of the elements according to FIG. 2 connected together.

DETAILED DESCRIPTION OF THE INVENTION

Figure 1:
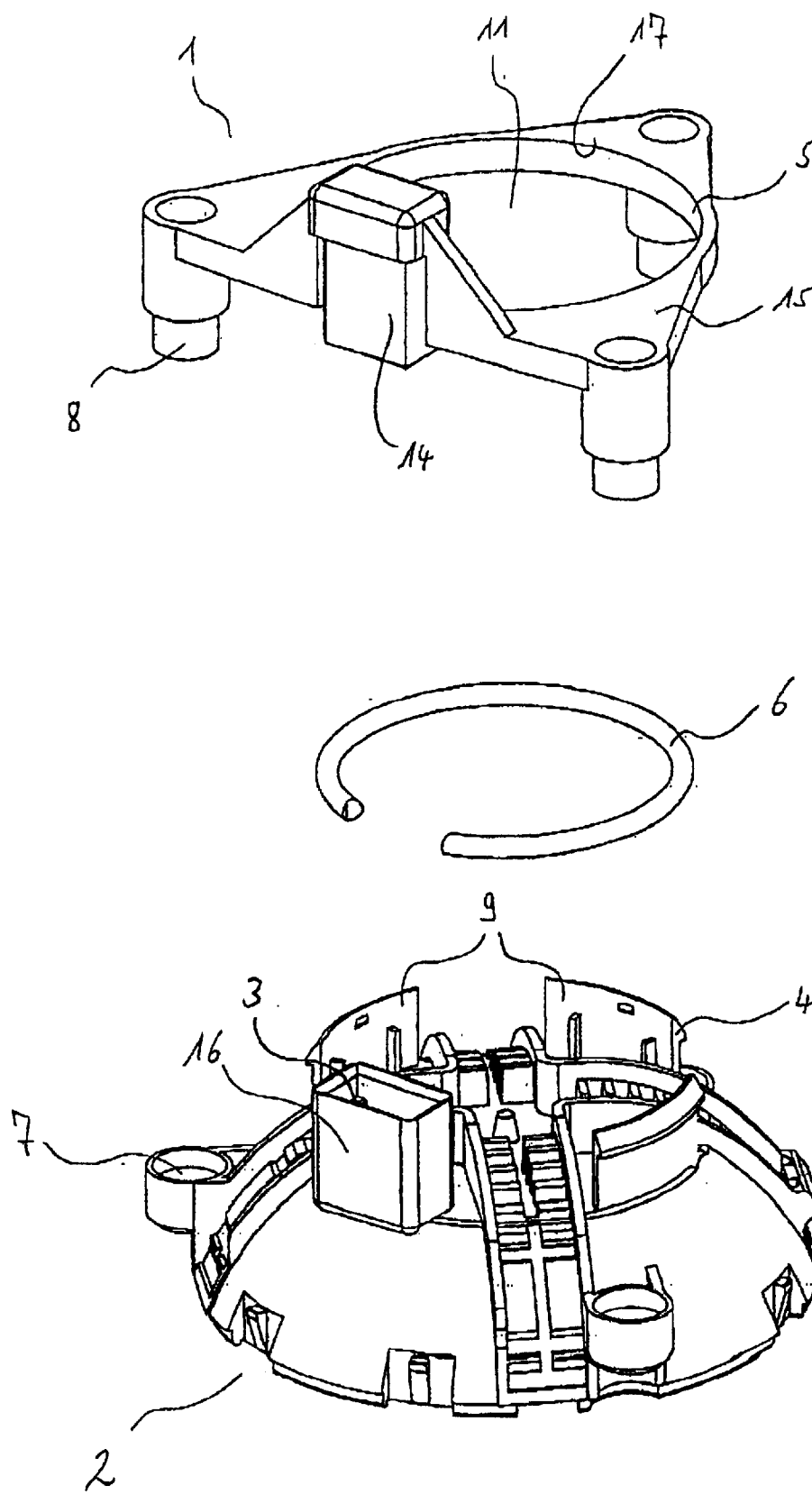
FIG. 1 is an exploded perspective view of a mirror carrier, a spring washer, and a drive housing according to one embodiment of the invention.

FIG. 1 shows a mirror carrier 1 as well as a drive housing 2 of a motor vehicle rearview mirror, with the drive housing being appropriate for being locked into the mirror carrier by means of a snap fastening and connected thereto as well as for being fixed in place with a spring washer 6.

As shown in FIG. 1, the mirror carrier 1 has an essentially triangular base plate 15 with three evenly spaced cylindrical feet 8 extending downwards. The cylindrical feet 8 are provided for a plug connection to complementary recesses 7 arranged on the drive housing 2. A plug 14, mounted on the base plate 15, points in the same direction as the cylindrical feet 8. The base plate 15 has a circular opening 11 into which the snapping segments 9, that are fastened on the part of the drive housing 2 facing the mirror carrier 1, lock when they are inserted into the opening 11 of the mirror carrier 1.

A socket 16 with electrical contacts 3 is formed on the drive housing 2 and points in the same direction as the snapping segments 9 so that, when the snap segments 9 are locked in and extending over the edge 17 of the opening 11 of the mirror carrier 1, an electrical contact is ensured at the same time between the (hidden) electrical connections present in the plug connection 14 and the corresponding electrical connections 3 in the socket 16. As an alternative to the conductors 3, the socket 16 may include electrical conducting strips 30 that are secured along the interior of socket 16. Complementary strips 32 are formed on the exterior of plug 14. When plug 14 is placed inside socket 16, electrical strips 30 and 32 make conductive contact. At the same time, the feet 8 slide into and engage the recesses 7. The combination of the snapping segments 9, the edge 17 of the circular opening 11, the cylindrical feet 8 and the recesses 7 all work together to create a twist-proof and displacement-proof connection between the mirror carrier 1 and the drive housing 2.

In an alternative embodiment, which is not shown, conductive strips are integrated into or on portions of the mirror carrier 1 that have contact points for contacting the electrical contacts 3 of the drive housing 2.

Figure 2:
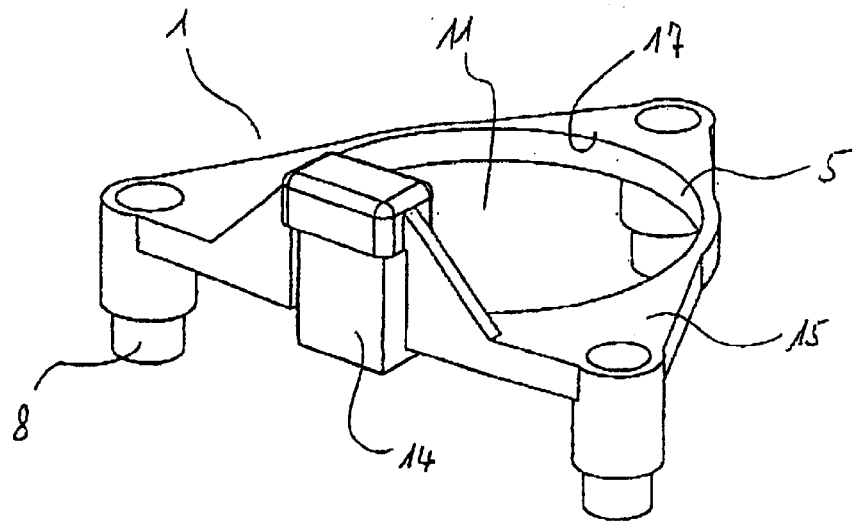
FIG. 2 is an exploded perspective view of the elements according to FIG. 1, where a mirror glass carrier is mounted to the drive housing.
Figure 2:
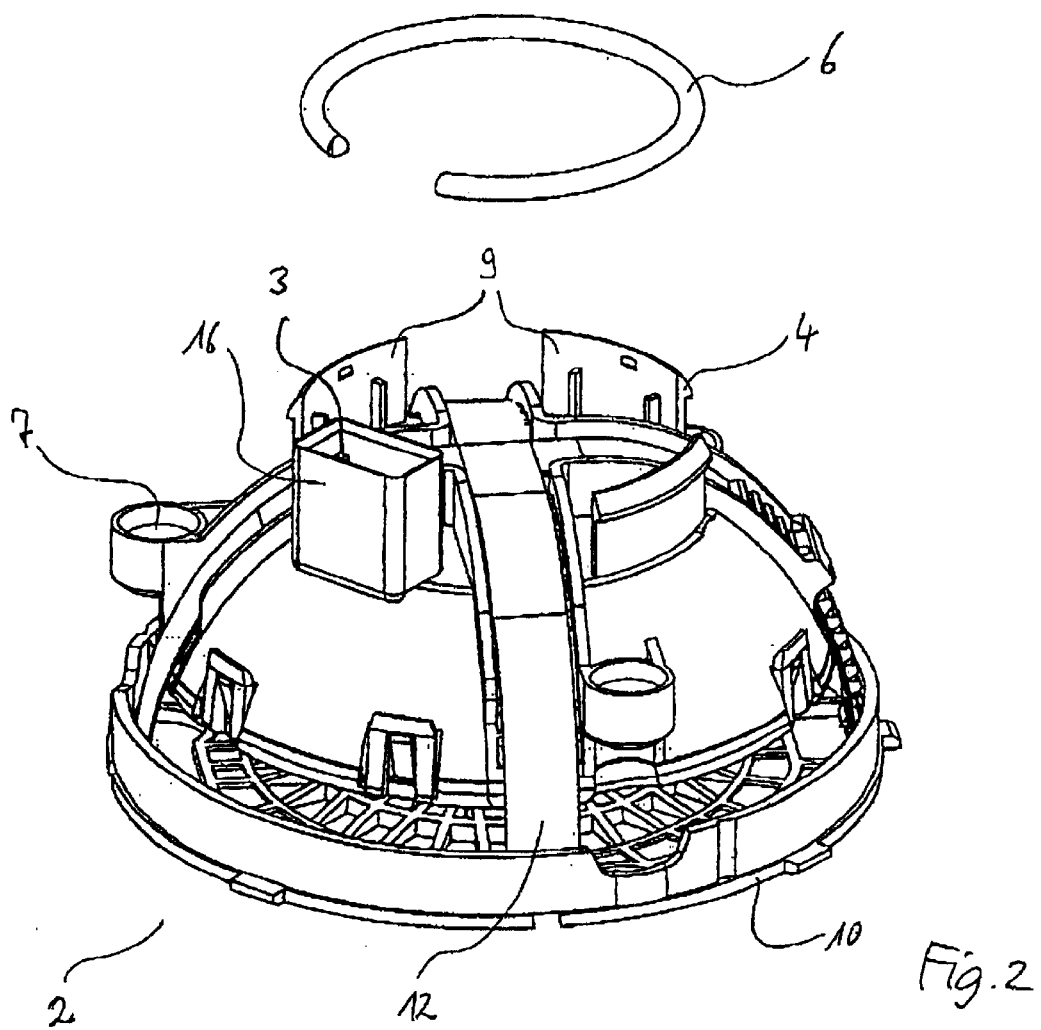

FIG. 2 shows the mirror carrier 1 in a state in which a mirror glass carrier 10 is attached to the drive housing. Customarily, a mirror plate is attached to the mirror glass carrier 10. Also attached to the drive housing 2 is a force transfer device 12 which is discussed in co-pending U.S. patent application Ser. No. 09/559,398, Actuating Mechanism for Motor Vehicles, filed Apr. 26, 2000, and incorporated by reference herein as if reproduced in full.

Figure 3:
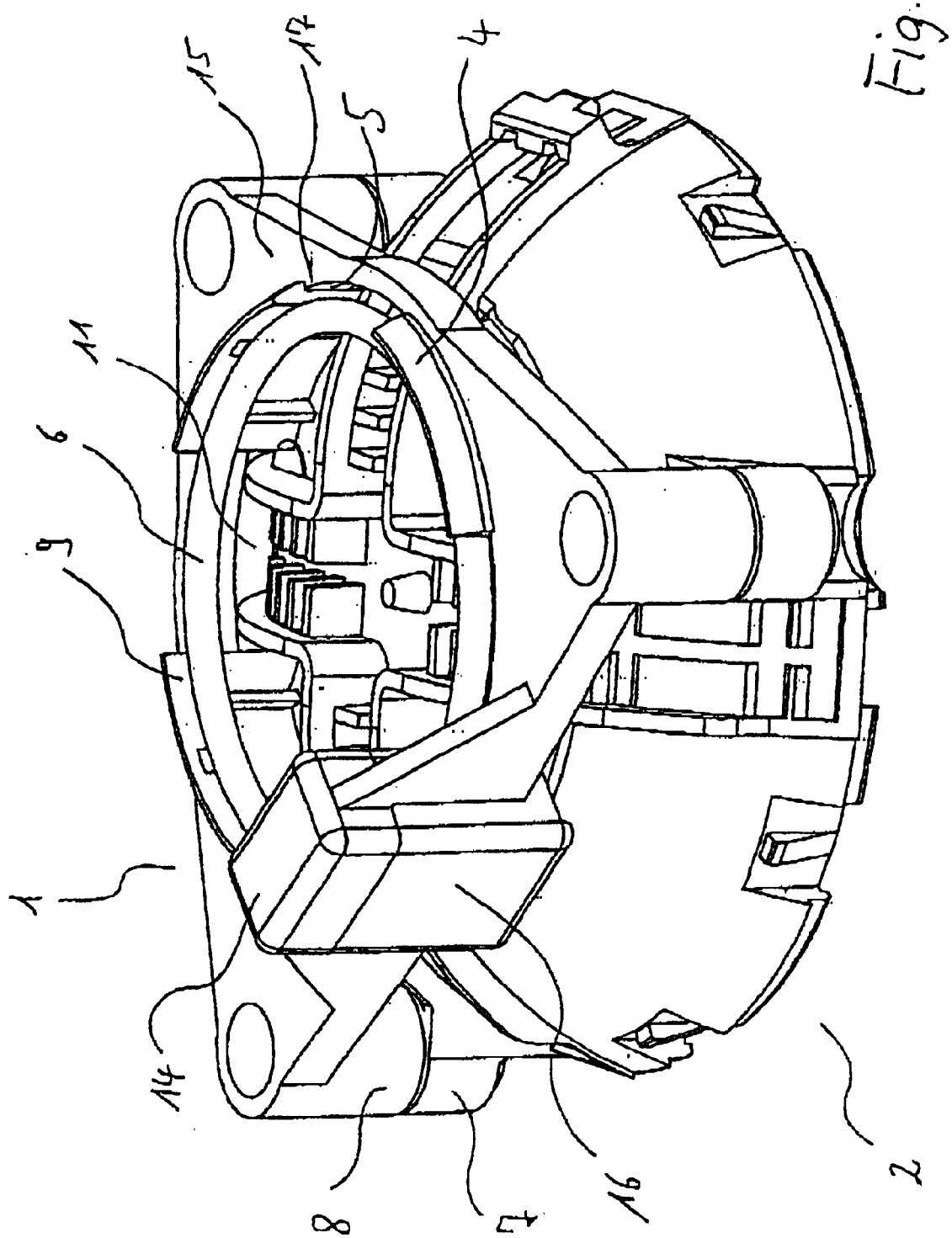
FIG. 3 is a perspective view of the elements according to FIG. 1 connected together.

FIG. 3 shows the assembled rearview mirror where the snapping segments 9 are brought into engagement with the edge 17 of the opening 11 of the mirror carrier 1 and fixed into place by a metallic spring washer 6 in such a way that a snapping out or falling off of the plate 15 of the mirror carrier 1 is prevented. FIG. 4 shows the arrangement with an attached mirror glass carrier.

The drive housing 2 can be removed from the mirror carrier 1 when the spring washer 6 is removed using the pressure of a finger and the snapping segments 9 are pressed inward away from edge 17 and into the opening 11, i.e., are unlocked by means of gentle inward compression.

From the above, it can be seen that the invention not only relates to an adjustable rearview mirror with a drive housing attached by means of a snap connection and, optionally, an additional plug or adhesive connection and a mirror carrier 1, but also a mounting process for connecting the drive housing to the mirror carrier.

The described embodiments are to be considered in all respects as illustrative and not restrictive. The present invention may be embodied in other specific forms without departing from its intent or essential characteristics.

What is claimed is:

1. An adjustable rearview mirror for a vehicle, the rearview mirror comprising:

a drive housing;

a mirror carrier;

snapping segments secured to one of the drive housing and the mirror carrier, and an edge defined on the other of the drive housing and the mirror carrier, said edge mating with the snapping segments to connect the drive housing to the mirror carrier, and wherein the mirror carrier and the drive housing each have electrical contacts that are embodied in such a way that, during the snapping together of the mirror carrier and the drive housing, an electrical connection is created between the mirror carrier and the drive housing at the same time.

2. The rearview mirror in accordance with claim 1, wherein conductive strips are integrated on or into the mirror carrier as contact points for contacting the electrical contacts of the drive housing.

3. The rearview mirror in accordance with claim 1, wherein the electrical contacts are each incorporated into a plug connection and a corresponding socket, with the socket being arranged on one of the drive housing and the mirror carrier and the plug connection being arranged correspondingly on the other of the mirror carrier and the drive housing.

4. The rearview mirror in accordance with claim 1, wherein each snapping segment has a first contour and the edge has a second contour, which is complementary to the first contour.

5. The rearview mirror in accordance with claim 4, wherein a plug/socket arrangement for producing the electrical connection and for securing against twisting is formed between the mirror carrier and the drive housing on and/or integrated with the first and/or second contour.

6. The rearview mirror in accordance with claim 1, wherein a spring device is provided for securing the snapping segments in place.

7. The rearview mirror in accordance with claim 1, wherein the mirror carrier is formed as one piece with a holder for mounting on the vehicle.

8. The rearview mirror in accordance with claim 1, further comprising:

recesses defined in the drive housing and cylindrical feet defined on the mirror carrier, and wherein the recesses engage the cylindrical feet.

9. The rearview mirror in accordance with claim 8, wherein an anti-twist securing of the drive housing relative to the mirror carrier is brought about by the cylindrical feet of the mirror carrier in the recesses of the drive housing.

10. An adjustable rearview mirror for a vehicle, the rearview mirror comprising:

a drive housing;

a mirror carrier;

snapping segments secured to one of the drive housing and the mirror carrier, and an edge defined on the other of the drive housing and the mirror carrier, said edge mating with the snapping segments to connect the drive housing to the mirror carrier; and a mirror glass carrier mounted on the drive housing, wherein the drive housing has a plurality of at least partially elastic snapping segments that are arranged on the opposite side of the drive housing from the mirror glass carrier, and are positioned for engaging behind the edge of the mirror carrier such that, in the engaged state, a firm connection between the drive housing and the mirror carrier is maintained by the elastic return force of the snapping segments.

11. The rearview mirror in accordance with claim 10, wherein the recesses of the drive housing are simultaneously constructed as screwing-in recesses for an alternative manner of fastening the drive housing to the mirror carrier.

12. The rearview mirror in accordance with claim 10, wherein each snapping segment has a first contour and the edge has a second contour, which is complementary to the first contour.

13. The rearview mirror in accordance with claim 12, wherein a plug/socket arrangement for producing the electrical connection and for securing against twisting is formed between the mirror carrier and the drive housing on and/or integrated with the first and/or second contour.

14. The rearview mirror in accordance with one claim 10, wherein a spring device is provided for securing the snapping segments in place.

15. The rearview mirror in accordance with claim 10, wherein the mirror carrier is formed as one piece with a holder for mounting on the vehicle.

16. The rearview mirror in accordance with claim 10, further comprising:

recesses defined in the drive housing and cylindrical feet defined on the mirror carrier, and wherein the recesses engage the cylindrical feet.

17. The rearview mirror in accordance with claim 16, wherein an anti-twist securing of the drive housing relative to the mirror carrier is brought about by the cylindrical feet of the mirror carrier in the recesses of the drive housing.

18. An adjustable rearview mirror for a vehicle, the rearview mirror comprising:

a drive housing;

a mirror carrier;

snapping segments secured to one of the drive housing and the mirror carrier, and an edge defined on the other of the drive housing and the mirror carrier, said edge mating with the snapping segments to connect the drive housing to the mirror carrier, and wherein the drive housing, upon which a mirror glass carrier, a force transfer device between the drive housing and the mirror glass carrier, as well as a mirror glass are fully mounted, can be connected to the mirror carrier in a single process step.

19. The rearview mirror in accordance with claim 18, wherein each snapping segment has a first contour and the edge has a second contour, which is complementary to the first contour.

20. The rearview mirror in accordance with one claim 18, wherein a spring device is provided for securing the snapping segments in place.

21. The rearview mirror in accordance with claim 18, wherein the mirror carrier is formed as one piece with a holder for mounting on the vehicle.

22. The rearview mirror in accordance with claim 18, further comprising:

recesses defined in the drive housing and cylindrical feet defined on the mirror carrier, and wherein the recesses engage the cylindrical feet.

23. The rearview mirror in accordance with claim 22, wherein an anti-twist securing of the drive housing relative to the mirror carrier is brought about by the cylindrical feet of the mirror carrier in the recesses of the drive housing.

* * * * *